UNITED STATES PATENT OFFICE.

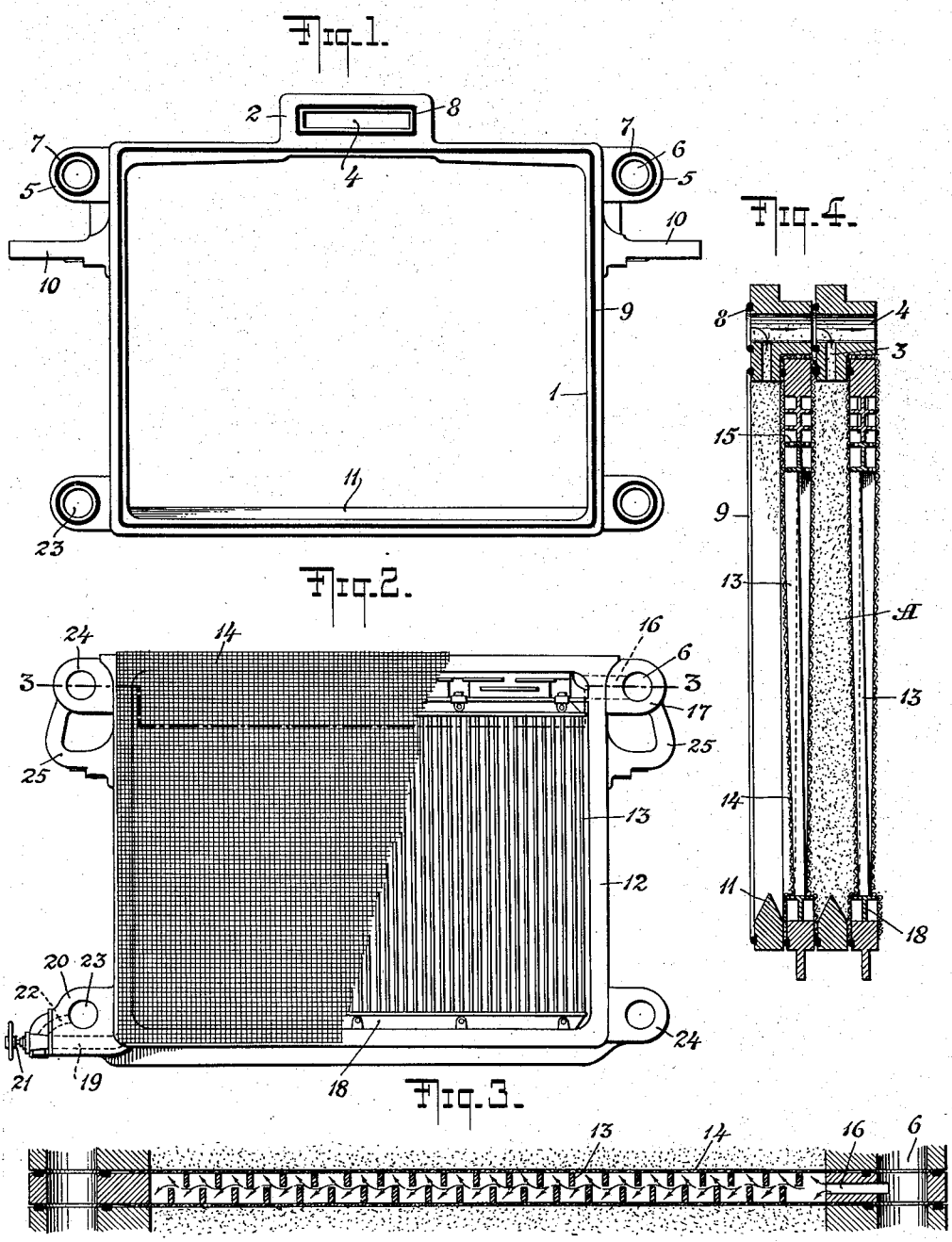

JOSEPH SCHAEFER, OF FRANKFORT-ON-THE-MAIN, GERMANY.

MASH-FILTER PLATE.

1,138,251.  Specification of Letters Patent.  Patented May 4, 1915.

Application filed July 30, 1913. Serial No. 781,964.

*To all whom it may concern:*

Be it known that I, JOSEPH SCHAEFER, a citizen of the German Empire, residing in Frankfort-on-the-Main, Germany, have invented a new and useful Improvement in Mash-Filter Plates, of which the following is a specification.

My invention relates to mash filters adapted for use in the arts of brewing, distilling or in the manufacture of compressed yeast, and in part is a continuation of my application No. 684,715 filed March 19, 1912.

The object of the invention is to construct the water chamber frames of filter presses that the grains cakes formed between adjacent filter cake frames will be of such shape as to greatly facilitate the complete sparging thereof without the use of an excessive amount of water. Grains cakes formed in the usual way are uniform in thickness from top to bottom, and it has been found that in sparging such cakes, the sugars and soluble matter are more completely removed from the lower part of the grains cakes because of the greater water pressure in the lower part of the frames. This results in the loss of more or less of the valuable sugars unless an excessive amount of water is used. The use of too much water is not desirable since this dilutes the wort to such an extent, that, to remove the excess of water, extended boiling is required which, it should be understood, is expensive and detrimental to the final product. To overcome these objections I have arranged the water chambers so that the grains cakes formed therebetween will be thicker at the bottom than at the top, or substantially trapezoidal in shape. It has been found that with cakes of this shape the sparging is more thorough, and with the use of a given quantity of water the soluble sugars are more uniformly and completely removed from the grains cakes.

Another object of my invention is to facilitate the removal of the grains cakes from their frames when the sparging process is completed, and the series of frames are separated for this purpose. The frame as ordinarily constructed is provided with a flat floor or bottom from which it is difficult to dislodge that part of the cake resting on the bottom, it usually being necessary for the workman to scrape it off with a paddle or other device. With my improved construction I overcome this objection by constructing the bottom or floor of each grains cake frame, wedge-shaped or like a tool edge in cross-section. This construction is adapted to save the time of the workman for, as the grains cakes are friable, it will be seen that a mere tap of a hammer will cause the bottom of the grains cake to separate and slide down on each side of the wedge-shaped bottom of the cake frame, and thus leave the frame clean without any further effort on the part of workman.

One form of my invention is illustrated in the accompanying drawings of which—

Figure 1 represents a side elevation of the grains cake frame; Fig. 2 a side elevation of the water chamber frame with the filter cloth partially broken away; Fig 3 a cross section of the water chamber frame along the line 3—3 of Fig. 2 together with parts of the adjacent grains cake frames; and Fig. 4 is a vertical cross-section of assembled frames.

The grains cake frame 1, illustrated in Fig. 1 of the drawings, is of the usual open rectangular construction and is provided with a tubular boss or projection 2 at the top thereof having a channel 3 extending from a transverse channel 4 to the interior of the grains cake frame, as will best be seen in Fig. 4 of the drawings. The object of this channel construction is to permit the introduction of the mash into the grains cake frames between the water chamber frames in the usual manner as hereinafter more fully explained. The grains cakes frame is also provided with lateral projections 5 which are provided with tubular channels or holes 6 which are adapted to coincide with similar channels in lugs connected with the water chamber frame to form continuous tubular channels for the passage of water or wort, during the operation of the filter. In order to make all of these various channels water-tight, they are provided with packing rings 7 and 8 while the entire grains cake frame is surrounded by a similar packing ring 9. With these rings in place it will be seen that when the series of frames is clamped together in the usual way, the joints between adjacent frames will be sealed by the packing rings so that the various channels from frame to frame, and the chambers within the frames themselves will be water-tight. The grains cakes frames are further provided with laterally projecting ears or lugs 10 which in the well known manner, serve as supports for the frames when placed in the filter press.

My improved grains cake frame is provided, as shown in Figs. 1 and 4 with a prism-like bottom or floor 11, which extends upward something like an inverted V and forms a knife edge upon which the bottom of the grains cake rests. As previously pointed out, this construction permits rapid cleaning of the grains cake frame when the frames are separated for this purpose, for it will be understood that the cake will readily fall out, and a slight tap of the hammer will cause any remaining parts near the bottom of the cake to slide down the surfaces of the prism or knife edge, thus completely freeing the frame of the brewers' grains. This is an important feature in that it saves labor and permits the workmen to thoroughly clean the filter in a very short time and get it ready for another operation.

My improved water chamber frame is represented in Figs. 2 to 4 in which 12 represents a rectangular open frame in which I mount a plurality of staggered bars 13, some of which have their outer surfaces in substantially the same plane on one face of the water frame, and some of which have them in another plane on the other face of the water frame, thereby forming supporting means for the filter cloths 14 which are stretched over each side of the water chamber frames and between these frames and the adjacent grains cake frames. The bars 13 together with the filter cloths thus form the supporting sides for the filter or grains cakes A formed in the grains cake frames. As previously pointed out, I have so arranged the water chamber frames that the grains cakes will be formed trapezoidal in shape, with the thicker part of the trapezoid at the bottom as clearly indicated in Fig. 4 of the drawings. This may be accomplished, for instance, by spreading or staggering the alternate bars 13 at the top so that the filter cloths are spaced farther apart at the top or upper part of the water chamber frames than at the bottom. This construction will be clearly seen in Figs. 3 and 4 of the drawings, where it will also be seen, that the upper part of the water chamber frame is provided with a series of transverse ribs 15, which, as indicated in Fig. 2 of the drawings, are staggered so as to form communicating channels leading from channel 16 (shown in dotted lines of Fig. 2 and in section in Fig. 3) connected with the holes of tubular channels 6 in lugs 17 projecting laterally from the upper side of the water chamber frame. This channel 6 as previously indicated, is adapted to be continuous with the channels 6 in the adjacent grains cake frames as indicated in Fig. 3 of the drawings. Water may be admitted through the channel 6 and the lateral channels 16 to the water chamber frame for sparging the filter cake A and removing the sugars therefrom in the usual or any preferred manner. The lower ends of the bars 13 are brought into substantially the same line near the bottom of the water chamber as indicated in Fig. 4 and secured in a bar 18 which is T-shaped in cross section, thereby forming below the bars 13, transverse channels through which the wort is adapted to flow to the sub-channel 19 (and shown in dotted lines in Fig. 2) which extends through the lateral lug or ear 20, and may be closed by a faucet or valve 21 in the usual manner. An additional channel 22 leads from the channel 19 through the faucet or valve 21, into the tubular channel 23 which by means of the connection between it and the adjacent tubular channels in the grains cake frames, forms a continuous channel through which the wort flows to the desired point. Additional lugs 24 are shown as extending laterally from the water chamber frame and provided with tubular openings which are adapted, as previously pointed out, to coincide with corresponding tubular lugs on the grains cake frames to form additional tubular channels for controlling the circulation of the fluids in any desired manner. The water chamber frames are provided with handle lugs 25 extending laterally therefrom, the lower face of each of which is adapted to correspond with the lower face of lugs 10 on the grains cake frames, and thereby support the frames in such position that the channels 6 and 23, and the channels through lugs 24 shall all coincide respectively to form the continuous channels previously mentioned. From this arrangement it will be seen that when a series of frames is mounted in a filter press, the alternate frames will be water chamber frames over which are stretched the filter cloths 14, which form the lateral supports for the filter cakes. The bars arranged in the water chamber frames, will permit the formation of the trapezoidal shaped filter cake as explained. In addition it will be noticed that the knife edge construction for the bottom of the grains cake frames, will enable the ready removal of the grains cake from the individual frames after the sparging operation is complete and the series of frames is separated for cleaning. The bar construction and staggered arrangement thereof, is such that the water chamber is more or less open for the free circulation of the water from end to end as indicated by the arrow in Fig. 3 of the drawing, which, it will be understood, is desirable for the thorough sparging of the grains cake.

I do not wish to be limited to the various minor details of construction in the form of device shown, for it will be understood that various modifications may be made without departing from the spirit and scope of the claims.

I claim:

1. In a mash filter the combination of water chamber frames, grains cake frames, filter cloths therebetween, and means in the water chamber frames adapted in coöperation with the filter cloths to permit the formation of trapezoidal grains cake in the grains cake frames, the thicker portion of which cakes project beyond the planes of separation between the grains cake and water chamber frames and into the latter, substantially as described.

2. In a mash filter the combination of water chamber frames, grains cake frames, filter cloths therebetween, supporting means arranged in upwardly diverging planes on each side of each water chamber frame and adapted to support the filter cloths so that grains cakes formed in the grains cake frames between the filter cloths shall be trapezoidal in cross section, the thicker portion of which cakes project beyond the planes of separation between the grains cake and water chamber frames and into the latter, substantially as described.

3. In a mash filter the combination of a plurality of water chamber frames, bars extending upwardly from the base of each water chamber frame, the edges of the bars on each side of the frame lying in planes diverging upward, a plurality of grains cake frames alternating with the water chamber frames, and filter cloths therebetween adapted to rest against said bars in the water chamber frames so that grains cakes formed in the grains cake frames shall be thicker at the bottom than at the top, substantially as described.

4. In a mash filter the combination of water chamber frames, grains cake frames, filter cloths therebetween, means in the water chamber frames adapted in coöperation with the filter cloths to permit the formation of trapezoidal grains cakes in the grains cake frames, and means on the floor of said grains cake frame adapted to facilitate the removal of the grains cakes substantially as described.

5. In a mash filter the combination of a grains cake frame provided with a triangular prismatic floor and water chamber frames on each side thereof supporting filter cloths adapted to form the side supports for grains cakes, said prismatic floor being adapted to form a groove in the bottom of the grains cake thereby facilitating the removal of the grains cake from the frame substantially as described.

6. In a mash filter a water chamber frame provided with substantially vertical ribs for supporting filter cloths on each side thereof, there being open communication between the ribs transversely, longitudinally and vertically of the frame, the plane of the ribs on each side of the frame being at an angle to the corresponding face of the frame ring thereby permitting the filter cloths to converge toward the bottom of said frame so as to leave wedge shaped spaces, broader at the bottom, between the cloths which are adapted to belly out into contact with said ribs while the edges of the cloths remain in the planes of the faces of the frame on each side thereof, substantially as described.

In testimony whereof I have hereunto set my hand in the presence of two subscribing witnesses.

JOSEPH SCHAEFER.

Witnesses:
WILLIAM DAWSON, Jr.,
CARL GRUND.